United States Patent [19]
Hahn et al.

[11] 3,874,809
[45] Apr. 1, 1975

[54] APPARATUS FOR MACHINING SURFACE OF REVOLUTION HAVING DISCONTINUITIES

[75] Inventors: Robert S. Hahn, Northboro; Arthur F. St. Andre, Marlboro; Edward G. Robillard, Worcester, all of Mass.

[73] Assignee: Cincinnati Milacron-Heald Corp., Worcester, Mass.

[22] Filed: Dec. 13, 1973

[21] Appl. No.: 424,444

Related U.S. Application Data

[63] Continuation of Ser. No. 321,219, Jan. 5, 1973, abandoned, which is a continuation-in-part of Ser. No. 194,581, Nov. 1, 1971, abandoned, which is a continuation of Ser. No. 877,093, Nov. 17, 1969, abandoned.

[52] U.S. Cl. .............. 408/3, 408/9, 408/12, 82/DIG. 1, 82/1 C, 82/29 R
[51] Int. Cl. .................... B23b 47/18, B23b 25/00

[58] Field of Search .............. 408/1, 3, 6, 9, 12; 318/164; 82/DIG. 1, 1, 1 C, 29; 29/64

[56] References Cited
UNITED STATES PATENTS

| | | | |
|---|---|---|---|
| 2,060,437 | 11/1936 | Harley | 318/164 |
| 2,880,629 | 4/1959 | Pope et al. | 408/12 |
| 3,548,172 | 12/1970 | Centner et al. | 408/3 |
| 3,573,588 | 4/1971 | Geyer et al. | 318/164 UX |

*Primary Examiner*—Gil Weidenfeld
*Attorney, Agent, or Firm*—Norman S. Blodgett; Gerry A. Blodgett

[57] ABSTRACT

The present invention relates to a machining apparatus and, more particularly, to a machine tool for use in generating a surface on a workpiece by use of tools formed of ceramic or other hard materials, such as carbide.

3 Claims, 10 Drawing Figures

TOOL LIFE VS CUTTING CONDITIONS
.055 DEPTH OF CUT

TOOL LIFE VS CUTTING CONDITIONS .055 DEPTH OF CUT

APPARATUS FOR MACHINING SURFACE OF REVOLUTION HAVING DISCONTINUITIES

RELATIONSHIP TO CO-PENDING APPLICATIONS

This application is a continuation of application Ser. No. 321,219 filed Jan. 5, 1973, which was a continuation-in-part of application Ser. No. 194,581 filed Nov. 1, 1971, which was a continuation of application Ser. No. 877,093 filed Nov. 17, 1969, all now abandoned.

BACKGROUND OF THE INVENTION

It has become common practice to make use of ceramic tools in the machining of workpieces. Because of the extreme hardness and high strength of this material, it is possible to perform machining operations under production conditions that were not possible before. The ceramic tool retains its strength and hardness even at fairly high temperatures, so it is possible to do extreme amounts of work; that is to say, it is possible to remove metal at high speeds. However, in the past, it has not been possible to make full use of ceramic tools because there is a tendency for incipient cracks to form on the outer surface of the tool in the area where the cutting is being done. These cracks gradually enlarge and, eventually, result in the destruction of the tool. Attempts to overcome this deficiency have been less than successful and the tendency has been to use conventional tungsten carbide tools at much lower speed with consequent loss in efficiency. This loss in efficiency of cutting is particularly important when the tool is at the working end of an expensive machine tool whose capitol cost is high and whose economic usefulness is dependent upon the volume of metal removed. These and other difficulties experienced with the prior art devices have been obviated in a novel manner by the present invention.

It is, therefore, an outstanding object of the invention to provide apparatus for machining with a ceramic tool which permits metal removal at a high rate of speed without shortening the life of the tool.

Another object of this invention is the provision of a machine tool using a ceramic cutter wherein the cutter has a long life of useful service.

A further object of the present invention is the provision of a method of machining which results in long life for a ceramic cutting tool.

It is another object of the instant invention to provide a machine tool having a control means for reducing thermal and mechanical shock when a cutting tool engages a portion of the workpiece having a deeper cut than previously.

A still further object of the invention is the provision of a method of machining for reducing the tendency of a ceramic tool to develop surface cracking.

It is a further object of the invention to provide a machine tool which reduces the tendency of ceramic tools to have a life that is dependent more on the number of machining cycles performed than on the amount of metal removed.

With these and other objects in view, as will be apparent to those skilled in the art, the invention resides in the combination of parts set forth in the specification and covered by the claims appended hereto.

SUMMARY OF THE INVENTION

In general, the invention consists of an apparatus for machining a workpiece with a ceramic tool. The apparatus has a base, a work support mounted on the base, and a tool support mounted on the base. Means is provided for bringing about relative movement of the supports relative to one another to move the tool and workpiece together for a machining operation. Means is provided to produce slow motion when the tool is adjacent an edge of the workpiece and to produce relatively rapid movement when the tool is machining the workpiece at a portion remote from an edge.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
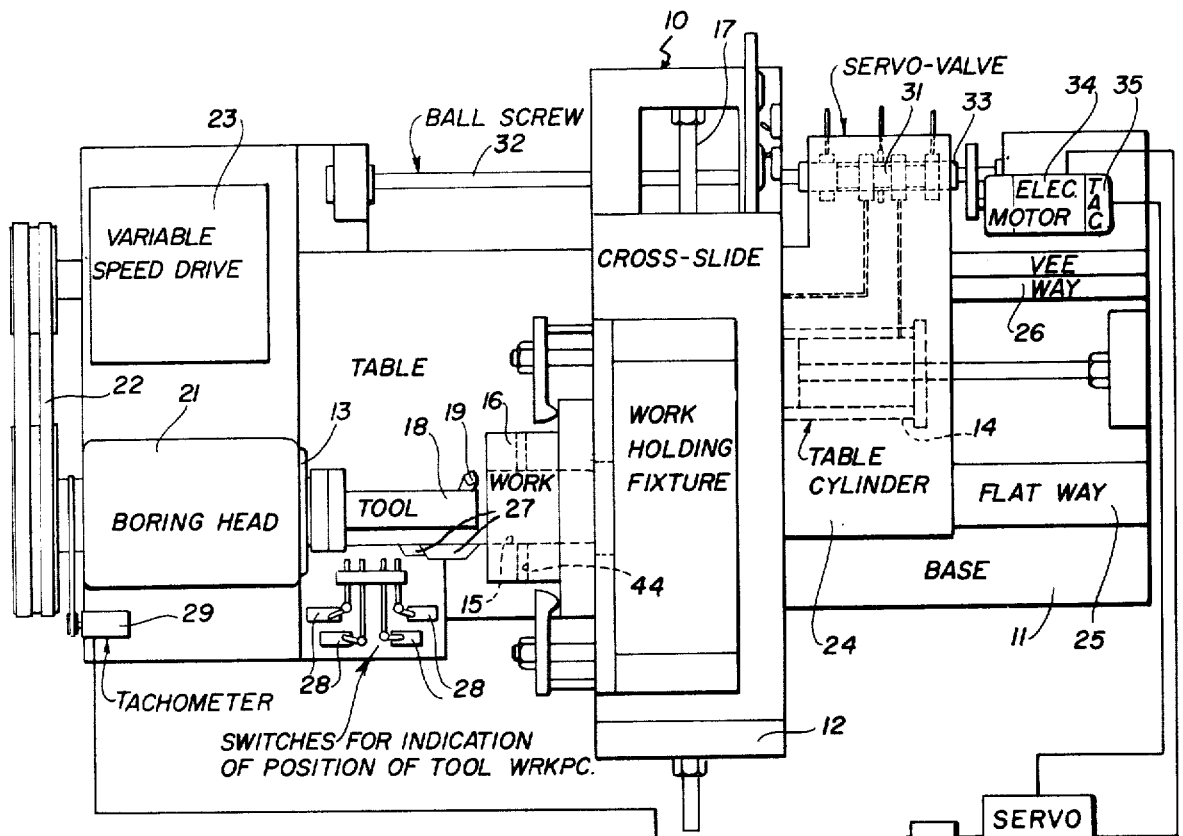
FIG. 1 is a schematic view of an apparatus embodying the principles of the present invention.

Referring first to FIG. 1, wherein are best shown the general features of the invention, the apparatus, indicated generally by the reference numeral 10, is shown for the purposes of description as a boring machine. It is provided with a base 11 on which is mounted a workpiece support 12 and a tool support 13. A hydraulic cylinder 14 produces longitudinal motion of the workpiece support 12 in the direction of the axis of a cylindrical surface 15 to be generated on a workpiece 16 attached to the workpiece support. The workpiece support also is subject to a transverse adjusting motion by means of a screw 17.

The tool support 13 consists of a rotatable boring bar or spindle 18 having on its outer end a ceramic cutting tool 19. The spindle is mounted in a boring head 21 driven through belts 22 by a variable speed electric motor 23. Mounted on the tool support 13 and operated by the rotation of the spindle 18 is a tachometer 29.

The workpiece support 12 is mounted on a table 24 which, in turn, is mounted on a flat way 25 and a Vee way 26. On the forward edge of the table are mounted cams 27 situated to operate limit switches 28 mounted on the front of the base 11.

Mounted on the workhead table 24 is a servo valve 31 which is connected by suitable passages to the cylinder 14. Extending from an abutment of the base 11 is an instrument ball screw 32 whose other end extends through and is connected to the spool 33 of the servo valve 31. This screw is rotated by an electric motor 34 having a tachometer 35 mounted on one end. The tachometer 29 is connected to lead adjustment control 37 which, in turn, is connected to a servo drive 38. The output of the drive 38 is connected to the motor 34, while the tachometer 35 feeds back to the drive.

Figure 2:
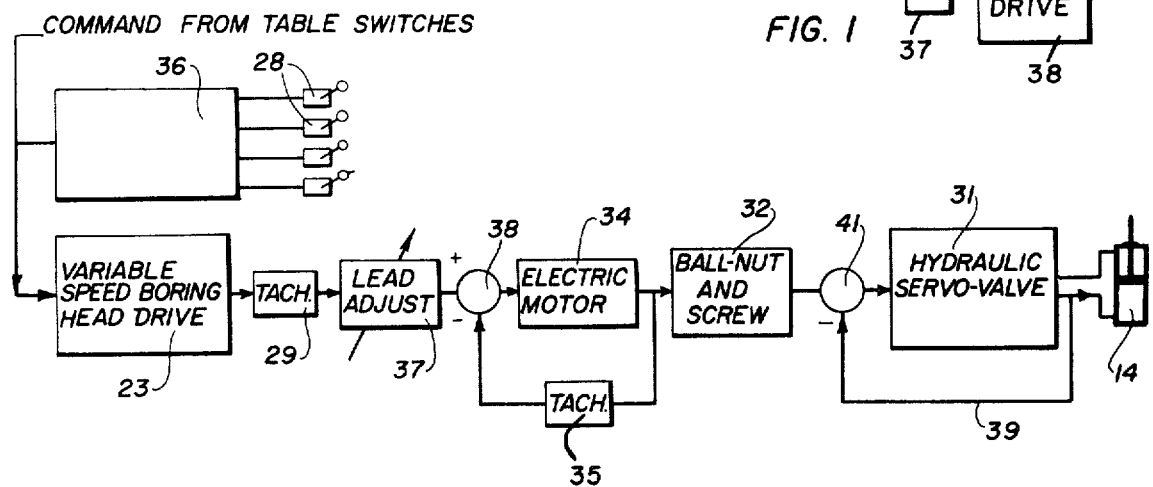
FIG. 2 is an electrical schematic diagram showing the control features of the apparatus.

Referring now to FIG. 2, it can be seen that the apparatus is provided with a main control 36 similar to the controls shown in the U.S. Pat. of Hohler No. 3,197,921. This control receives an indication of various tool positions relative to the workpiece 16 from the table switches 28. This control is connected to the boring head motor 23 and the resulting rotation of the boring head is transferred to the tachometer 29. This information is fed to the lead adjustment control 37 which, in turn, operates and controls the rate of rotation of the electric motor 34 and feeds this information back to the motor control or driver 38, so that the screw 32 operates at the proper speed. Rotation of the screw 32 brings about a suitable motion of the servo valve 31 which controls the cylinder 14. The feedback line 39 measures the output flow of fluid from the servo valve and sends this information back to a valve control 41, which makes suitable minor adjustments during operation to assure that the cylinder 14 proceeds at the proper rate.

Figure 3:
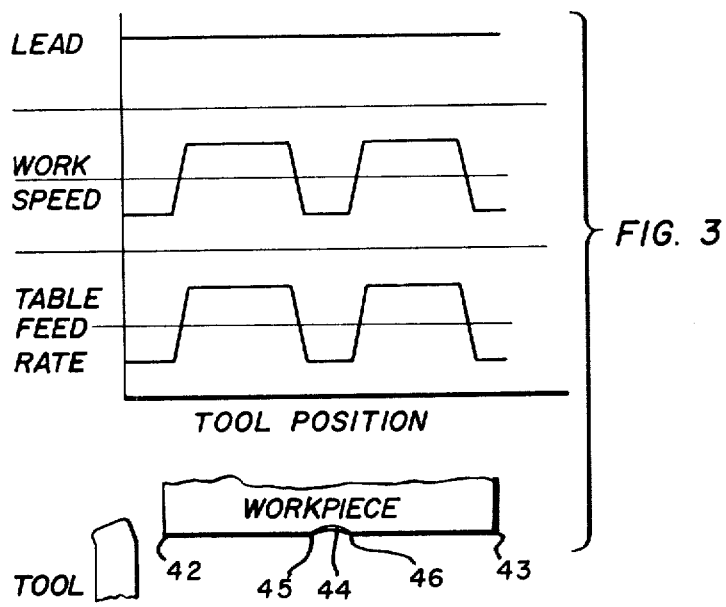
FIG. 3 is a graphical representation of the operation of the machine.

As shown in FIG. 3, the controls of the machine tool cause the work speed, which is determined by the motor 23 and the table feed rate, which is determined by the cylinder 14, to increase and decrease depending on the nature of the workpiece. The workpiece 16 has a leading edge 42 and an end edge 43. Furthermore, it is provided with an aperture 44 which has an edge 45 and an edge 46. When the tool 19 approaches the edge 42, it does so at a slow rate of tool rotational speed and table feed rate. After the tool has entered the work and begun a cut, the spindle speed and feed rate are increased and remain there until just before the tool comes to the edge 45 where the spindle speed and feed rate drop to a low level and remain at that low level until the tool has passed the edge 45, passed through the interruption in the cut presented by the hole 44, and moves well past the edge 46 of the hole. At that time, the tool is well into the body of the workpiece and the feed rate and spindle speed are raised to the high level again. Just before the tool reaches the edge 43, however, they are dropped to the low level once more.

Figure 4:
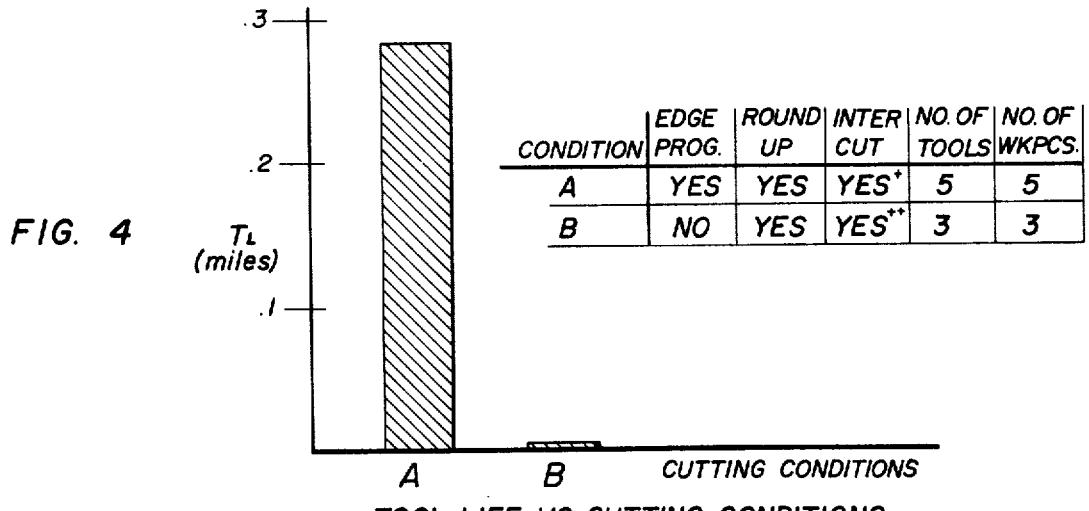
FIG. 4 is a graphical comparison of the life of a ceramic tool when subjected to the prior art methods of machining and to use in the apparatus of the present invention with an interrupted cut.

FIG. 4 shows the manner in which the life of a ceramic tool is extended by using this programmed form of machining. In the test situation B, a tool passes entirely through the workpiece at the same speed; even during the time that it passes through the interruption in the cut presented by the aperture 44, the tool speed and feed rate remain the same. As can be seen, the number of miles of cutting operation before the tool deteriorates to a useless form is a very low value indicated by the vertical column compared to the cutting condition A which uses the present invention.

Figure 5:
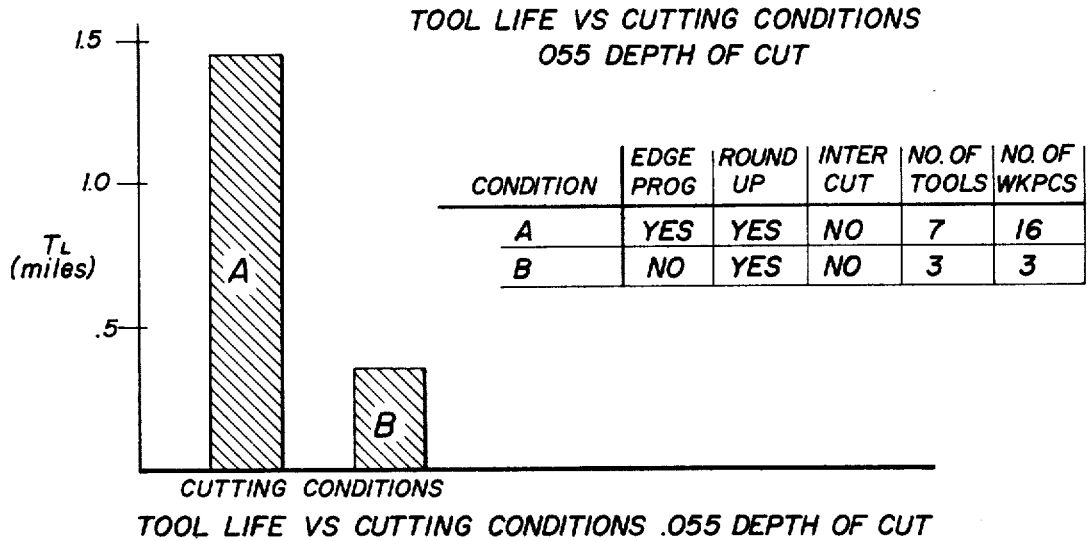
FIG. 5 is a graphical comparison of the life of a ceramic tool when subjected to the prior art methods of machining as compared with those of the present invention, but without an interrupted cut.

FIG. 5 shows somewhat of the same situation, but the workpiece used has no aperture (or "interrupted cut" situation). The tool life with prior art operation is somewhat longer, but is not anywhere near as long as was performed by use of the present programmed feed-speed mechanism. Actual cutting tests show that the high speed cutting capabilities of ceramic tools can be utilized to a much greater extent by employing the machining method described above. Tests indicated that the thermal shocks introduced to the tool by its passage from a cool air situation to a hot workpiece working situation cause extreme differences in temperature between adjacent parts of the tool, so that the outer surface begins to develop incipient cracks. These cracks become larger as the situation changes; this is partially due to the extreme stress differences between adjacent parts of the tool due to differences of expansion and contraction due to temperature and partly due to the fact that this hot-cold situation is alternately produced in most workpieces. Even if the workpiece is a simple one wherein the tool enters a leading edge, works through the workpiece without change of depth of cut, and then emerges from the far end of the surface, the rapid change in thermal conditions at these edges produces tool cracking problems. The situation is accentuated to a considerable extent when the workpiece is of such a nature that there is an interrupted cut. This interrupted cut can be caused by the presence of holes, grooves, keyways, and even by shoulders on the workpiece where the cutting depth changes rapidly. Tests have shown that the life of a ceramic tool is directly related not so much to the amount of metal removed during its life, but to the number of "cycles;" that is to say, the number of times it is brought up and down from its working temperature.

The present invention can best be described as a method of reducing the thermal shocks caused by sudden engagements and disengagements between the tool and workpiece. This is accomplished by allowing the tool to enter the workpiece at a low surface speed and feed rate and then, once the tool has been cutting for a few seconds, to increase the surface speed and feed rate simultaneously, thus utilizing the ceramic high speed capabilities. This allows the tool tip temperature to build up gradually, rather than subjecting the tip to thermal shock which, tests have shown, is responsible for cracking. The same procedure is followed at the end of the cut. The tool approaches the end of the cut at the high surface speed and feed rate. Just before the tool leaves the work, the surface speed and feed rate are reduced allowing the tool to exit at a lower temperature and thus reduce thermal shock. The same method is also employed for cutting workpieces with interruptions using ceramic tools. Interruptions are usually in the form of bolt circles, keyways, or the like. The surface speed and feed rate are reduced just before entering the interruption. The tool travels through the interruption and back into the workpiece at these low speeds and then, once cutting has resumed, the surface speed and feed rate are increased. This, as before, has the effect of reducing thermal shock.

In general, then, it might be said that the present invention consists in reducing the linear speed of cutting in the vicinity of a "discontinuity" in the workpiece. For the purposes of the present invention, the word discontinuity means any change in the amount of work being done by the cutting tool, whether one be approaching an edge from the air or approaching air from the workpiece, just as long as the destruction of the tool tip due to thermal shock takes place.

The net effect of the invention is to maintain the rate of change of energy generated at the tool to below a predetermined value. This, in turn, maintains the rate of change of temperature in the tool to below a predetermined value.

Figure 6:
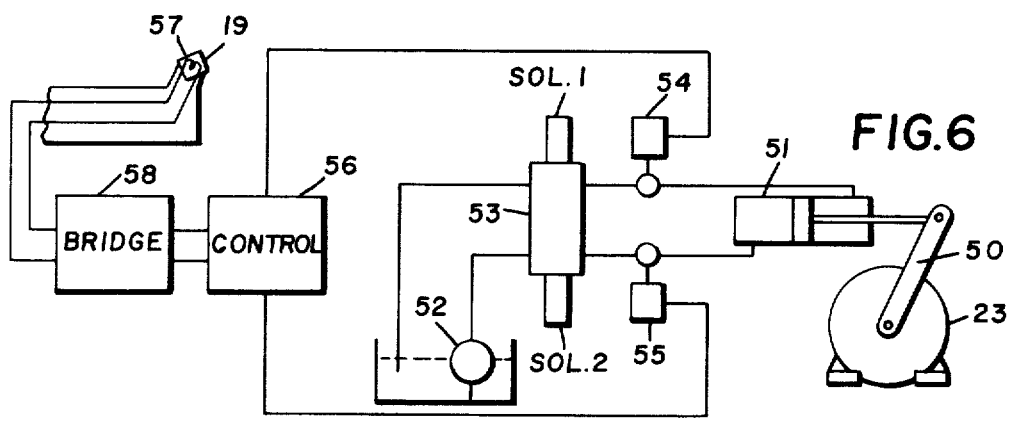
FIG. 6 is a diagrammatic view of a portion of the control apparatus.

FIG. 6 shows the details of the apparatus for controlling the variable speed drive 23. In the preferred embodiment the drive is provided by a hydraulic swashplate motor whose speed of rotation can be adjusted by a control handle 50. A hydraulic cylinder 51 has its piston rod connected to the handle for positioning the same and controlling the speed of rotation of the tool holder. A source 52 of hydraulic fluid under pressure operates through a solenoid valve 53 operated by solenoids SOL 1 and SOL 2 to move the cylinder. The hydraulic flow in the two lines from the valve to the cylinder is regulated by motor-controlled valves 54 and 55. The current for the motors on the valves 54 and 55 originates in a control 56. This control only sends current to these motors when the rate of change of the tool temperature goes over a predetermined value, indicating that the rate of change of generated energy (machining work) exceeds a safe value. The temperature at the tool 19 is measured by embedding a temperature-sensitive resistor 57 in the tool and introducing it into a conventional Wheatstone bridge 58. The output voltage of the bridge is indicative of the temperature in the tool and the control 56 analyzes this voltage and, when its rate of change exceeds a preselected value, it sends electrical current to the motor-controlled valves 54 and 55. The motors in the valves are operated to reduce the speed of the drive 23 (and also, indirectly, the speed of the motor 34) until the rate of temperature change is reduced to a safe value.

Figure 7:
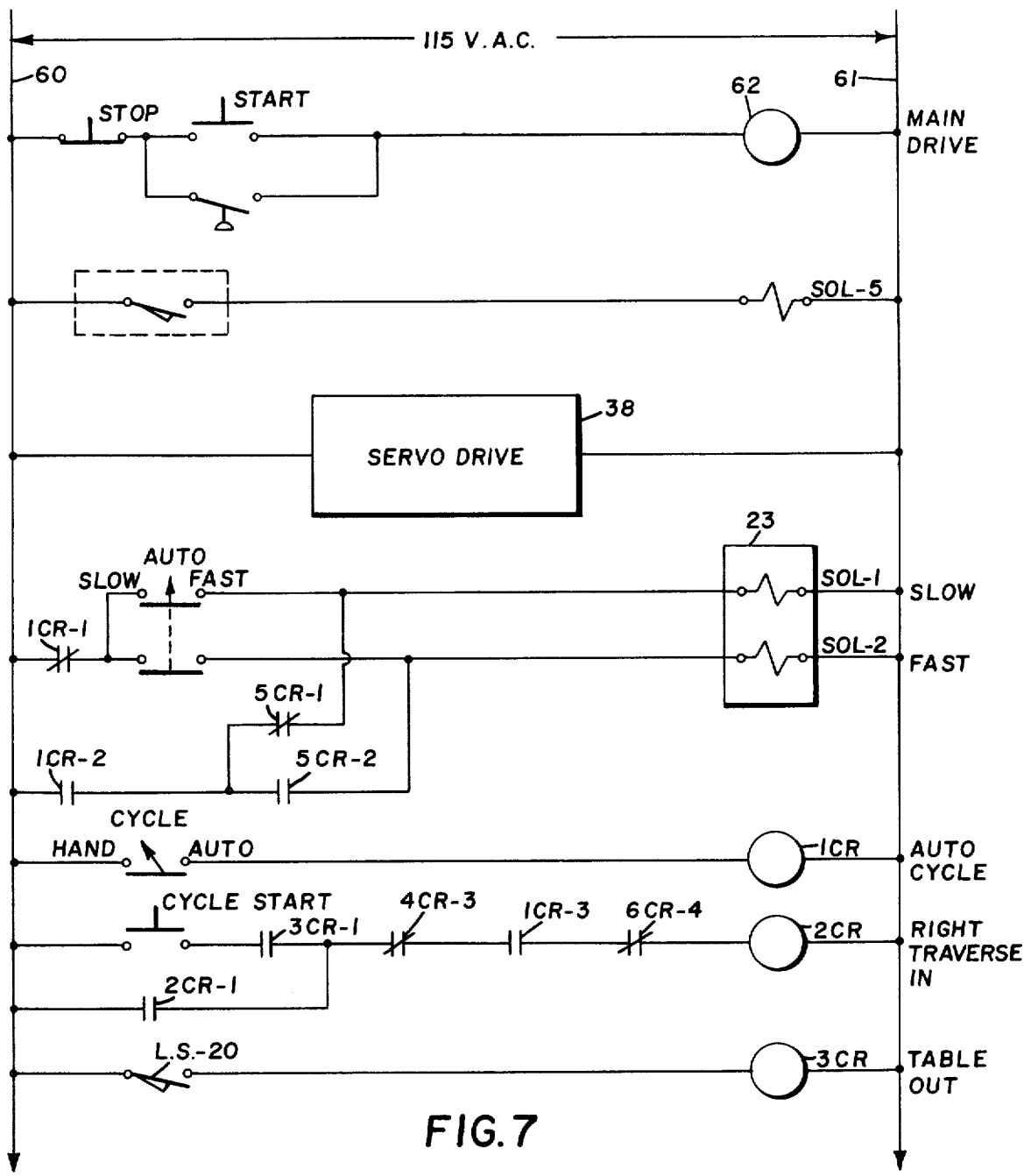
FIGS. 7 and 8 are electrical diagrams of the controls.
Figure 8:
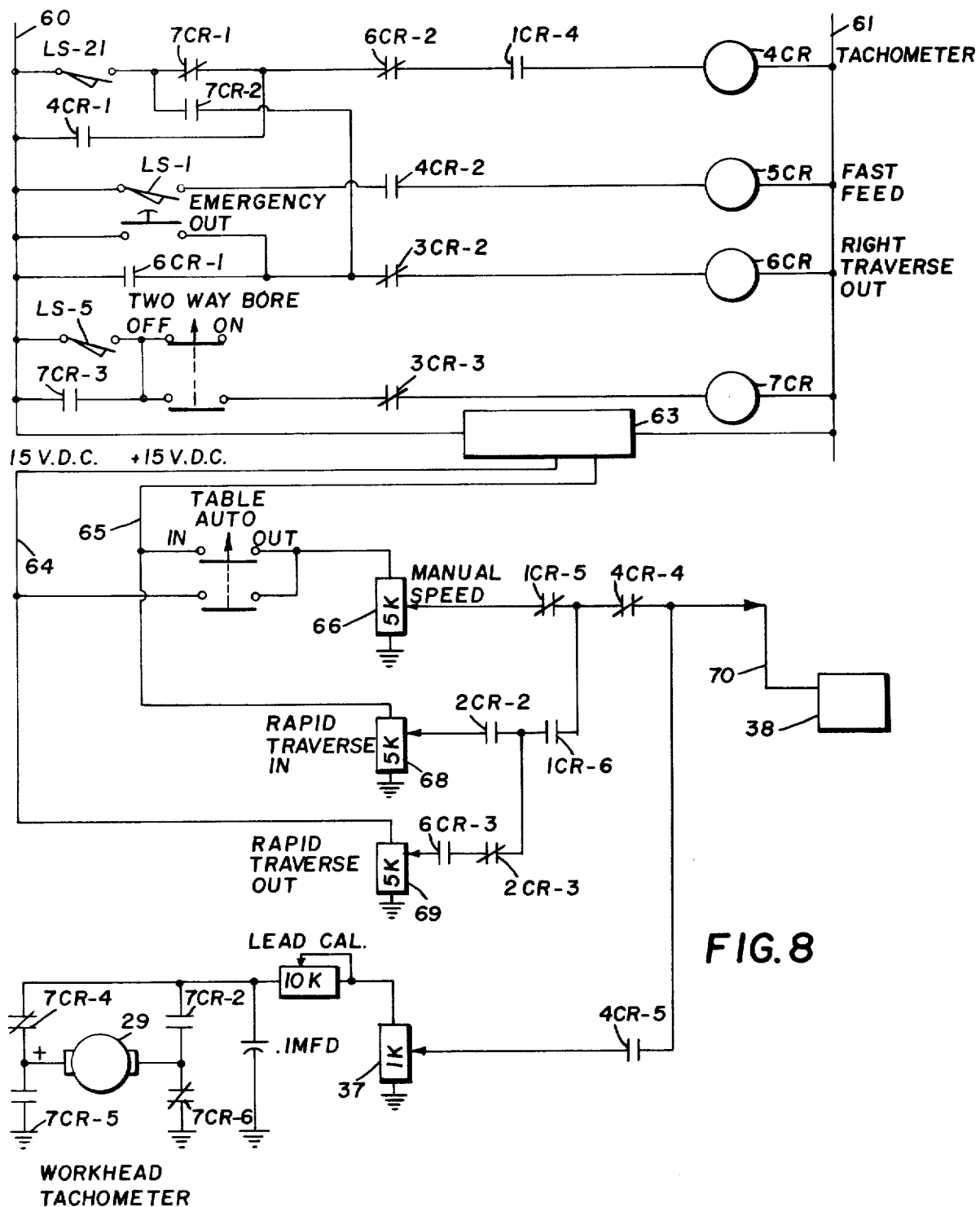

FIGS. 7 and 8 are electrical diagrams showing the details of the apparatus associated with the main control 36. Electricity in the form of 115-volt A.C. is introduced through the lines 60 and 61. A main drive motor 62 is introduced across the lines 60 and 61 by suitable switches; this motor supplies power for the hydraulic pumps, etc., in the usual way. The servo drive 38 also receives operating current from these lines. The solenoids SOL-1 and SOL-2 associated with the valve 53 are also connected across the lines 60 and 61 in series with a network of contactors 1CR-1, 1CR-2, 5CR-1, and 5CR-2. An AUTOCYCLE relay 1CR is connected across the power lines, as is a RIGHT TRAVERSE in relay 2CR and a TABLE OUT relay 3CR.

As is evident in FIG. 8, a TACHOMETER relay 4CR is connected across the line in association with contactors 1CR-4, 6CR-2, 7CR-1, 7CR-2, and 4CR-1, as well as switch LS-21. A FAST FEED relay 5CR is similarly connected in association with a switch LS-1 and a contactor 4CR-2. A RIGHT TRAVERSE OUT relay 6CR is connected between the power lines 60 and 61 along with contactors 3CR-2, 6CR-1, and switch LS-5. A relay 7CR is connected across the lines along with contactors 7CR-3 and 3CR-3.

A power supply 63 converts the 115-volt A.C. on the lines 60 and 61 to −15 and +15 volt D.C. which is placed on power lines 64 and 65. The line 65 is connected through a variable resistor 66 and contactors 1CR-5 and 4CR-4 to the servo drive or amplifier 38. The line leading to the amplifier is also connected through a contactor 4CR-5 to the lead adjusting potentiometer 37 which, in turn, is connected to the tachometer 29 in association with contactors 7CR-4, 7CR-5, 7CR-2. The line 65 is connected to an adjustable resistor 68 as well as contactors 2CR-2, 1CR-6, 2CR-3, and 6CR-3. A variable resistor 69 is connected to the line 64 and the relays associated with the resistor 68.

Figure 9:
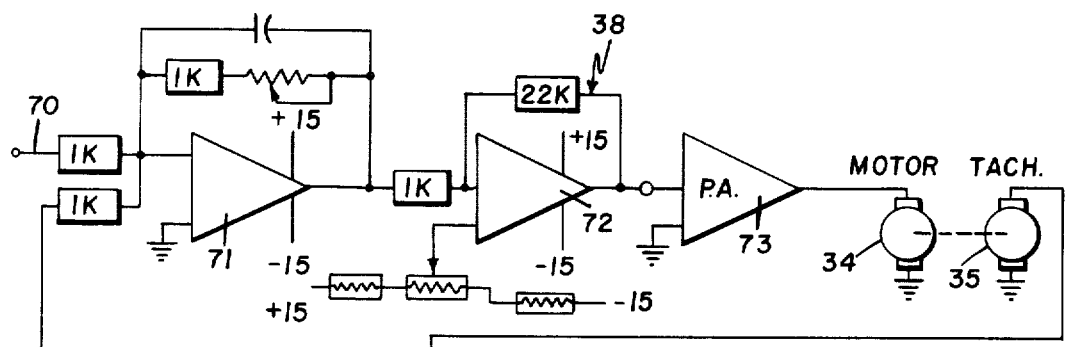
FIG. 9 is an electrical diagram of a servo amplifier forming part of the controls.

FIG. 9 shows the details of the servo amplifier 38. The command signal arrives at the input in a line 70 leading to it from one of the potentiometers 66, 68, 69 or 37 as selected for it by various relay contactors. This command signal passes through amplifiers 71 and 72 and is fed in a power amplifier 73 before passing to the motor 34.

Figure 10:
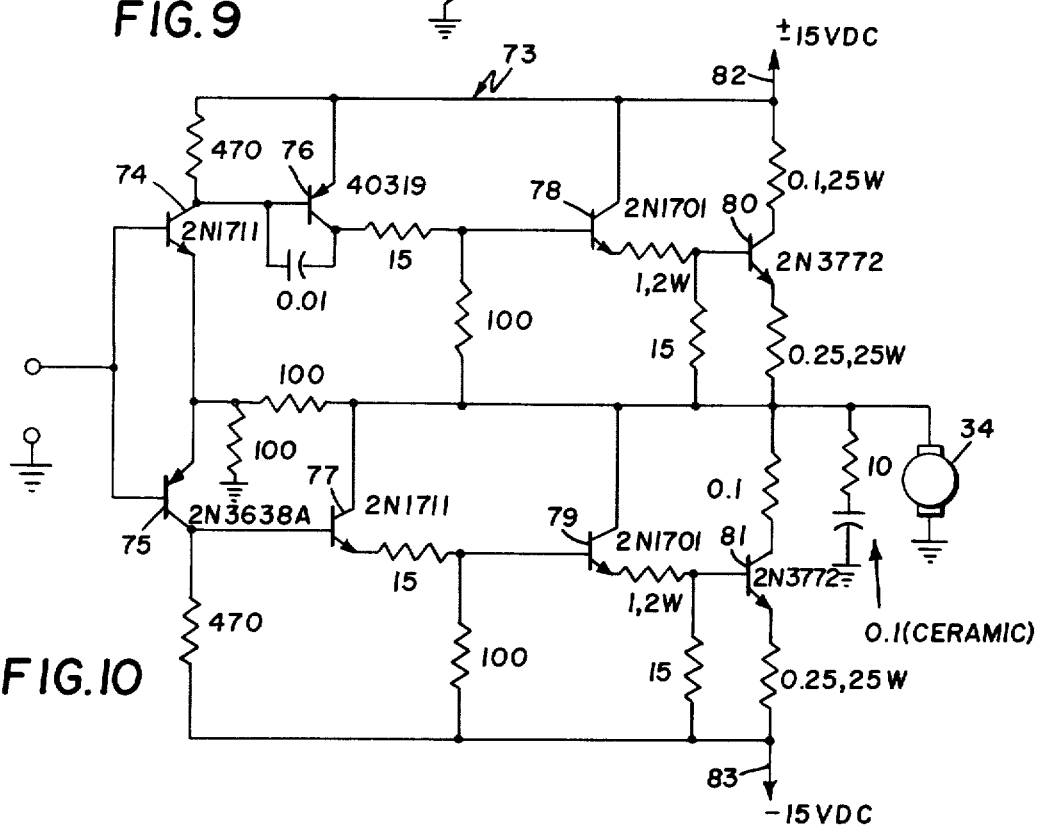
FIG. 10 is an electrical diagram of a driver and power amplifier forming part of the servo amplifier.

FIG. 10 shows the details of the circuitry of the power amplifier 73. Among other things, it includes transistors 74, 75, 76, 77, 78, 79, 80 and 81. It is connected by lines 82 and 83 to the +15 volt D.C. and −15 volt D.C. lines, respectively, and, of course, its output is connected to the motor 34.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for generating a surface of revolution having discontinuities on a workpiece by means of a ceramic tool, comprising:
   a. a base,
   b. a tool support mounted on the base and rotating the tool about the axis of the surface of revolution,
   c. a workpiece support slidably mounted on the base for feeding movement in the direction of the surface of revolution, and
   d. first control means regulating the rate of rotation of the tool and the speed of the feeding movement of the workpiece support so that the resultant speed of the tool through the workpiece is slow at a position adjacent a discontinuity and relatively rapid at a position remote from a discontinuity, the first control means being comprised of a variable speed motor driving a rotatable spindle on which the tool is mounted, of a hydraulic cylinder connected between the base and the tool support for moving the workpiece support, of a servo valve connected by hydraulic lines to the cylinder for regulating the cylinder, of a screw for adjusting the valve, of a motor connected to the screw for rotating the screw, and a second control means between the tool and the motor to maintain the lead of the helical path followed by the tool on the workpiece to remain constant irrespective of changes in rate of rotation of the spindle, the second control means comprising means provided on the workpiece support and the base corresponding to the location of disconuities in the workpiece surface relative to the tool and means to signal the first control means that the tool is arriving at the discontinuity.

2. Apparatus as recited in claim 1, wherein the first control means operates to control the rate of rotation of the tool and the speed of the feeding movement of the workpiece support so that their product is maintained at a constant value and the lead of the helix generated remains the same at all times.

3. Apparatus as recited in claim 1, wherein means is associated with the first control means to adjust the rate of change of tool rotation to maintain the rate of change of temperature in the tool below a predetermined value.

* * * * *